(12) United States Patent
Wyttenbach et al.

(10) Patent No.: US 9,513,068 B2
(45) Date of Patent: Dec. 6, 2016

(54) REACTIVE SOLID/HEAT-TRANSPORT GAS REACTOR INCLUDING A HELICAL DUCT IN WHICH THE SOLID AND THE GAS FLOW IN OPPOSITE DIRECTIONS

(75) Inventors: Joel Wyttenbach, Thoiry (FR); Philippe Papillon, Chambery (FR); Gwennyn Tanguy, Le Bourget du Lac (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 354 days.

(21) Appl. No.: 14/123,524

(22) PCT Filed: Jun. 7, 2012

(86) PCT No.: PCT/EP2012/060787
§ 371 (c)(1),
(2), (4) Date: Dec. 3, 2013

(87) PCT Pub. No.: WO2012/168352
PCT Pub. Date: Dec. 13, 2012

(65) Prior Publication Data
US 2014/0096933 A1    Apr. 10, 2014

(30) Foreign Application Priority Data
Jun. 7, 2011    (FR) ..................... 11 54962

(51) Int. Cl.
*F28F 13/10* (2006.01)
*B01D 53/08* (2006.01)
(Continued)

(52) U.S. Cl.
CPC ............. *F28F 13/10* (2013.01); *B01D 53/08* (2013.01); *B01J 8/12* (2013.01); *B01J 8/16* (2013.01);
(Continued)

(58) Field of Classification Search
CPC ........ F28F 13/10; B01D 53/08; B01D 53/261; B01D 53/28; B01D 2253/106; B01D 2257/80; B01J 8/12; B01J 8/16; B01J 2208/00292; B01J 2208/0053; B01J 2208/0084; B01J 2208/00849; Y02E 60/142
(Continued)

(56) References Cited

U.S. PATENT DOCUMENTS 320,642 A * 6/1885 Eastwick .................. F26B 5/04
34/171
329,198 A * 10/1885 Milne ................. F26B 17/1441
34/102
(Continued)

FOREIGN PATENT DOCUMENTS

| DE | 39 31 027 | 3/1990 |
|---|---|---|
| FR | 1 519 552 | 4/1968 |
| WO | 2009 138577 | 11/2009 |

OTHER PUBLICATIONS

N'tsoukpoe, K. E. et al., "A Review on long-term sorption solar energy storage", Renewable and Sustainable Energy Reviews, Elseviers Science, vol. 13, No. 9, pp. 2385-2396, XP026495339, (Dec. 1, 2009).
(Continued)

*Primary Examiner* — Tho V Duong
*Assistant Examiner* — Raheena Rehman
(74) *Attorney, Agent, or Firm* — Oblon, McClelland, Maier & Neustadt, L.L.P.

(57) ABSTRACT

A solid/heat-transport and reactive gas reactor, including: a helical duct including an inlet and an outlet, the helical duct defining a helical bottom track on which a solid reagent can slide from the inlet to the outlet of the helical duct; a mechanism for bringing the solid reagent to the inlet of the helical duct; a mechanism for causing a heat-transport gas to
(Continued)

flow in the helical duct, from the outlet to the inlet of the helical duct; a reservoir of solid reagent under the outlet of the helical duct; and a conveyor for conveying the reagent from a low point of the reservoir to the bringing mechanism.

8 Claims, 6 Drawing Sheets

(51) Int. Cl.
| | |
|---|---|
| *B01J 8/12* | (2006.01) |
| *B01J 8/16* | (2006.01) |
| *F28C 3/14* | (2006.01) |
| *F28D 20/00* | (2006.01) |
| *F28D 7/02* | (2006.01) |
| *F28D 7/14* | (2006.01) |
| *B01D 53/26* | (2006.01) |
| *B01D 53/28* | (2006.01) |

(52) U.S. Cl.
CPC .............. *F28C 3/14* (2013.01); *F28D 7/022* (2013.01); *F28D 7/14* (2013.01); *F28D 20/003* (2013.01); *B01D 53/261* (2013.01); *B01D 53/28* (2013.01); *B01D 2253/106* (2013.01); *B01D 2257/80* (2013.01); *B01J 2208/0053* (2013.01); *B01J 2208/0084* (2013.01); *B01J 2208/00292* (2013.01); *B01J 2208/00849* (2013.01); *Y02E 60/142* (2013.01)

(58) Field of Classification Search
USPC .................. 165/104.18, 104.16; 34/134, 171
See application file for complete search history.

(56) References Cited

U.S. PATENT DOCUMENTS

| | | | | |
|---|---|---|---|---|
| 2,069,192 | A * | 1/1937 | Behr | A23N 12/08 222/424 |
| 2,614,824 | A * | 10/1952 | Weber | F28C 3/14 165/104.18 |
| 2,700,830 | A * | 2/1955 | Wolfe | F26B 17/1408 34/171 |
| 2,983,051 | A * | 5/1961 | Zimmermann | F28C 3/14 34/164 |
| 3,549,295 | A * | 12/1970 | Galocsy | B01J 8/1836 165/104.15 |
| 3,717,938 | A * | 2/1973 | Sylvest | C04B 7/432 34/168 |
| 3,742,614 | A * | 7/1973 | Bettermann | C08G 85/00 34/147 |
| 4,035,151 | A * | 7/1977 | Czerny | B01J 8/16 198/756 |
| 4,124,997 | A * | 11/1978 | Sadjina | B02C 19/186 241/17 |
| 4,255,129 | A * | 3/1981 | Reed | C10B 7/04 110/258 |
| 4,369,834 | A * | 1/1983 | Meunier | C03B 5/237 122/7 R |
| 4,502,230 | A * | 3/1985 | Commer | F26B 3/00 165/156 |
| 4,896,717 | A * | 1/1990 | Campbell, Jr. | F22B 31/0084 110/245 |
| 5,109,918 | A * | 5/1992 | Huschka | B01J 19/1862 110/225 |
| 5,992,041 | A | 11/1999 | McClaine et al. | |
| 8,579,014 | B2 * | 11/2013 | Kauppila | F26B 3/22 165/104.13 |
| 2010/0012740 | A1 | 1/2010 | Paulus | |

OTHER PUBLICATIONS

Mauran, S. et al., "Solar heating and cooling by a thermochemical process. First experiments of a prototype storing 60 kW h by a solid/gas reaction", Solar Energy, Pergamon Press, vol. 82, No. 7, pp. 623-636, XP022679675, (Jul. 1, 2008).

Sharma, A. et al., "Review on thermal energy storage with phase change materials and applications", Renewable and Sustainable Energy Reviews, Elseviers Science, vol. 13, No. 2, pp. 318-345, XP025815806, (Feb. 1, 2009).

International Search Report Issued Oct. 2, 2012 in PCT/EP12/060787 Filed Jun. 7, 2012.

U.S. Appl. No. 14/113,958, filed Oct. 25, 2013, Wyttenbach, et al.

* cited by examiner

REACTIVE SOLID/HEAT-TRANSPORT GAS REACTOR INCLUDING A HELICAL DUCT IN WHICH THE SOLID AND THE GAS FLOW IN OPPOSITE DIRECTIONS

The invention relates to the field of reactive solid/heat-transport gas reactors, in which a chemical or physical reaction is provided between a solid and a gas, such as for example a thermochemical reaction or a physical adsorption/desorption reaction. In this type of reactor, the gas coming from an external circuit serves as a heat-transport agent and reagent, the heat exchange then taking place by convection during the endothermic/exothermic reaction.

This type of reactor, which is relatively recent, has already been the subject of a few developments. Nevertheless the design and performance of these reactors still need to be optimised.

For this purpose, the subject matter of the invention is a reactive solid/heat-transport gas reactor, comprising:
- a helical duct having an inlet and an outlet, said duct defining a helical bottom track on which a solid reagent is intended to slide from the inlet to the outlet of said helical duct;
- means for bringing the solid reagent to the inlet of said helical duct; and
- means for causing a heat-transport gas to flow in said helical duct, from the outlet to the inlet of this duct.

In addition, the reactor includes a reservoir of solid reagent under said outlet of the helical duct, as well as a conveyor for conveying the reactive solid from a low point of the reservoir to said means for bringing the solid reagent to the inlet of said helical duct.

The helical nature of the duct makes it possible to obtain a long residence time of the gas and solid in the reactor, while keeping a limited footprint. This promotes heat exchanges and the transfer of mass, further reinforced by the flow of the gas and solid in the reactor in opposite directions.

The heat-transport gas being intended to flow in the duct above the solid reagent sliding on the bottom track, the pressure drops are relatively low. This increases the performance of the reactor and reduces the power necessary for the flow of the heat-transport gas in the helical duct. In addition, this configuration makes it possible, when the reactor is operating, to deal with the changes in volumes of the reactive solid, which swells and then contracts during the two reciprocal reactions.

The original design proposed by the present invention makes it possible to benefit from a high density of a reactive solid in the reactor, and requires only limited requirements in terms of filtration of the gas, which prevents soiling and facilitates maintenance.

Furthermore, with the presence of the reservoir, the reactor can advantageously serve for the interseasonal storage of heat. This is because, in winter, the water vapour that enters a reservoir reacts with the dehydrated salt in order to form a hydrated salt and heat. Conversely, in summer, the warm dry air reacts with the previously hydrated salt in order to regenerate it. Thus the reservoir comprising the reactive solid serves for storing said heat. It should be noted that the conveyor can take the form of a worm, or any other device known to persons skilled in the art.

Preferably, said helical duct comprises a plurality of passages each emerging firstly on said helical bottom track, at a given turn on said duct, and secondly in the directly lower turn of the latter.

These passages can thus be taken by part of the reactive solid sliding on the bottom track, in order to join the directly lower turn. In this case, each part of the solid diverted through one of these passages therefore impacts, on leaving this passage, on the bed of reactive solid flowing in the lower turn. These impacts provide a breaking up and de-stratification of the bed of reactive solid, which further reinforces the heat exchanges and the transfer of mass. For the same purpose, deflectors can be provided on the bottom track for sliding of the solid.

Preferably, said helical duct is designed so that the reactive solid slides by gravity on said helical bottom track. A vertical orientation of the axis of the duct is then preferred, even if an inclination with respect to this vertical direction could be adopted, without departing from the scope of the invention. This solution with gravity sliding is advantageous since it requires no addition of energy for the movement of the reactive solid and therefore helps to obtain good performance of the reactor.

According to another embodiment, the reactor comprises means for vibrating said helical duct in order to cause the solid reactor to slide over said helical bottom track. It may for example be a vibrating pot, or similar means.

This vibrating-system solution may naturally be combined with the gravity-sliding solution disclosed above.

Preferably, the reactor includes a heat exchanger fed by the heat-transport gas coming from the inlet of said helical duct. This makes it possible to obtain a reactor-exchanger with a reduced footprint.

Preferably, said helical duct is implemented by a helix through which an internal cylinder passes and which is enclosed by an external cylinder.

Alternatively, it may be a first tube shaped in a helix. This solution has the advantage of being easy to implement, for example by means of a straight tube rolled hot in order to give it its helix shape, the turns being able to be in contact with one another or spaced apart. The particular form of this duct also simplifies the modelling/simulations of flows and heat exchanges.

The cross section of this tube is preferentially circular.

Alternatively, the reactor comprises a second tube also conformed in a helix, in which the first tube is inserted so as to define between them a space intended to have a heat-transport fluid pass through it, affording heat exchange with said heat-transport gas flowing in the first tube. The two tubes of the reactor then form an integral heat exchanger that is very compact.

Another subject of the invention is a method for a solid/heat-transport gas reaction implemented by means of a reactor as mentioned above. This method consists of sliding the reactive solid over the helical bottom track from the inlet to the outlet of said helical duct, and causing the heat-transport gas to flow in the opposite direction in said helical duct, from the outlet to the inlet of this duct.

Finally, it should be noted that the solid reagent is a powder, the grains of which preferentially have a mean diameter between 0.1 and 2 mm.

Other advantages and features of the invention will emerge from the following non-limitative detailed description.

This description will be given with regard to the accompanying drawings, among which:

Figure 1:
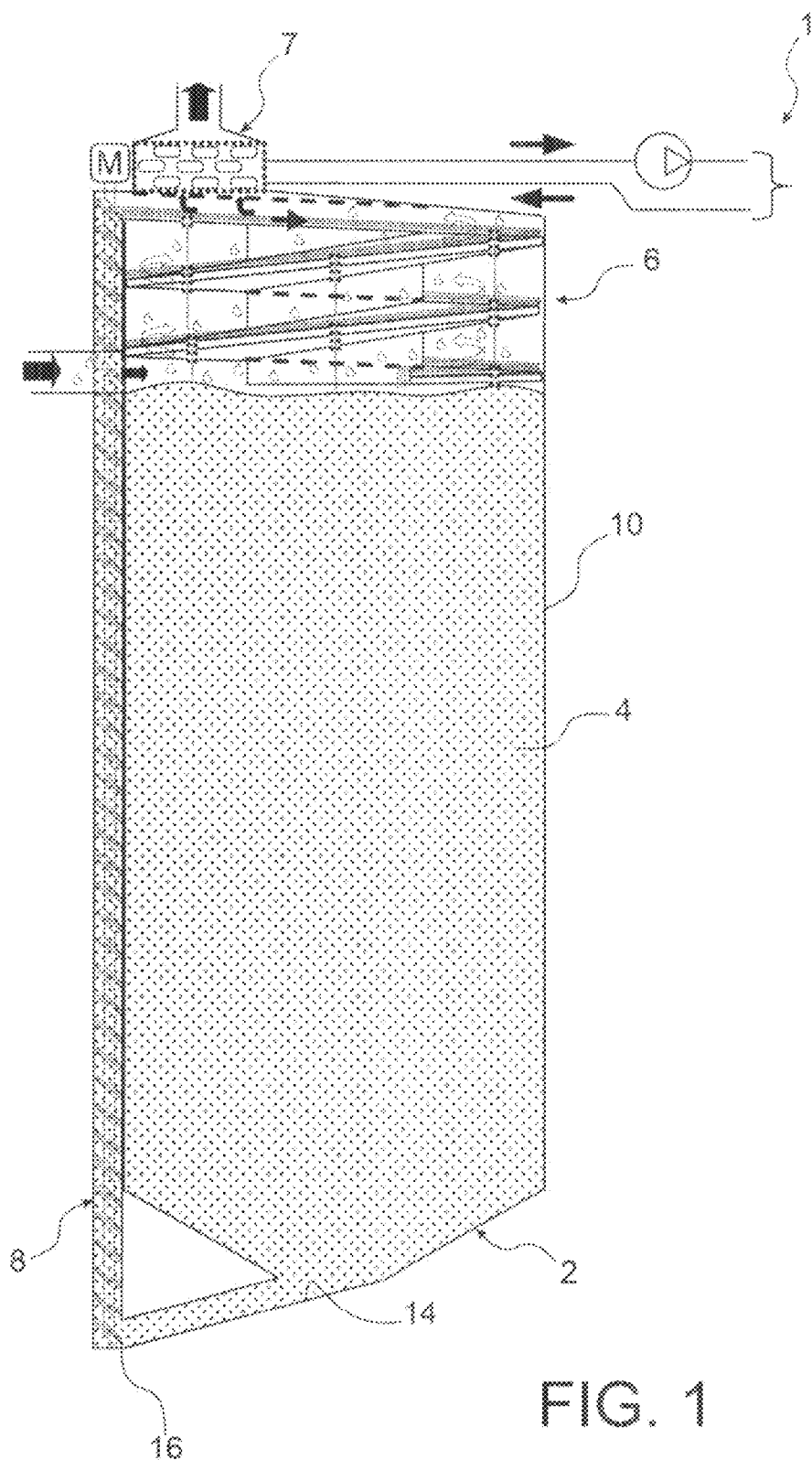
FIG. 1 shows a view in section in the mid-plane of a solid/heat-transport gas reactor according to a first preferred embodiment of the present invention.
Figure 2:
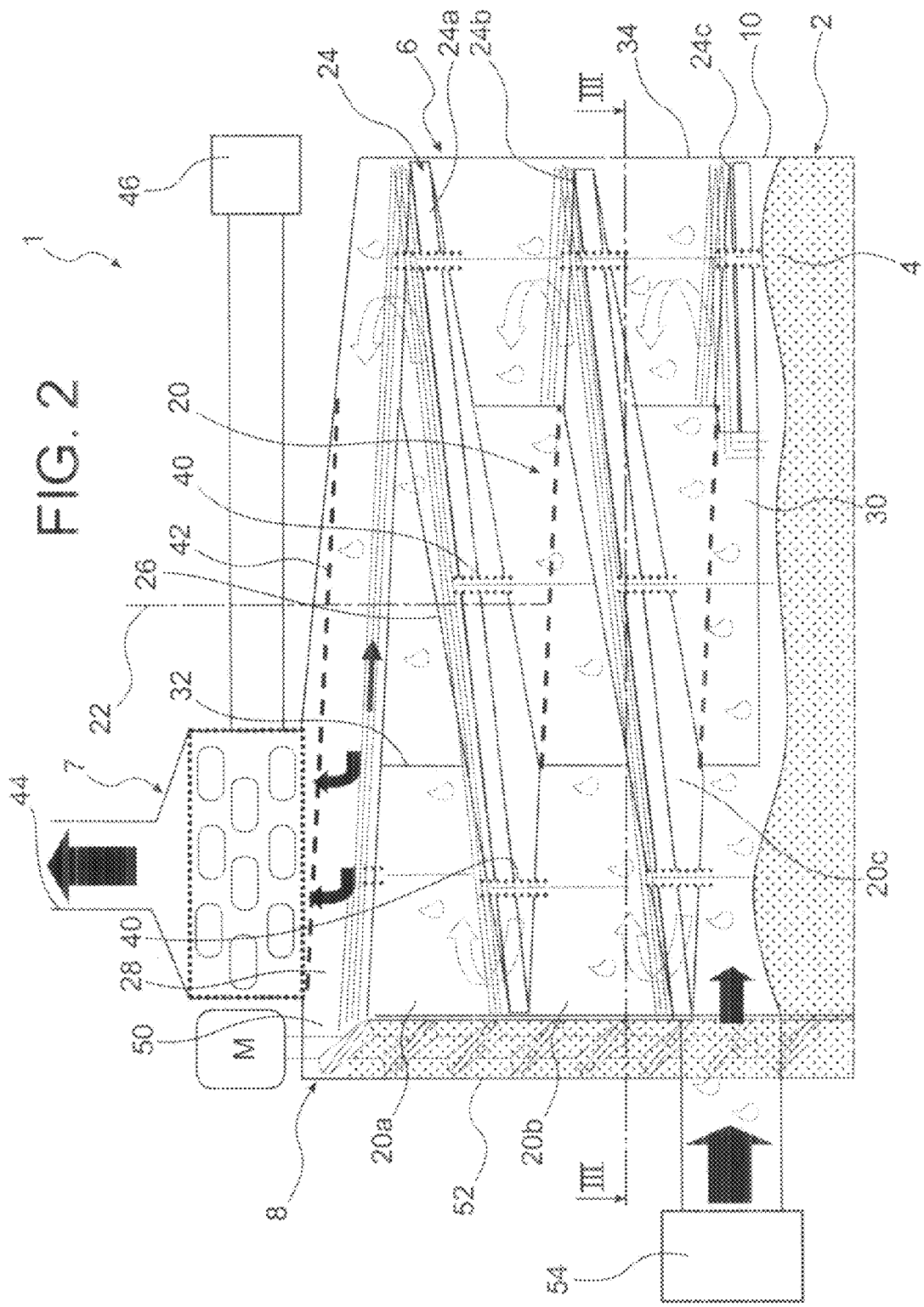
FIG. 2 shows an enlarged front view of a part of the reactor shown in the previous figure.
Figure 3:
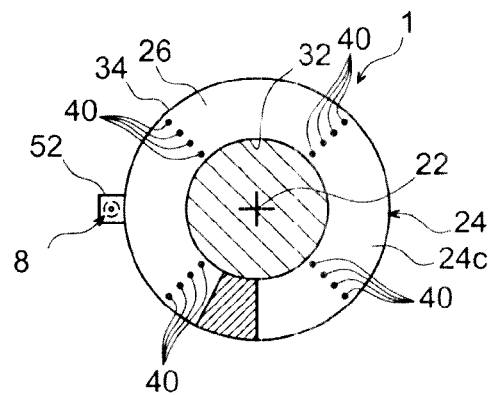
FIG. 3 is a view in section of the reactor in the previous figure, taken along the line III-III.

With reference first of all to FIGS. 1 to 3, a solid/heat-transport gas reactor 1 is shown, according to a first preferred embodiment of the present invention.

FIG. 1 shows the reactor 1 oriented vertically, in a position as adopted in operation. From bottom to top in this vertical direction and in the operating position of the reactor, the latter comprises a reservoir 2 of solid reagent 4, the body of the reactor 6, and then an air/liquid heat exchanger 7, the liquid preferentially being water. In addition, a vertical conveyor 8 runs vertically between the bottom of the reservoir and the top of the reactor body.

The reservoir 2 takes a roughly cylindrical shape, circular in cross section. It may be produced by means of a lateral metal sheet 10 made from stainless steel, for example around 1.5 mm thick, which is rolled so as to have a diameter of around 800 mm. Some plastics materials may also be envisaged in place of stainless steel.

The top part of the reservoir is open onto the bottom part of the reactor body 6, while its bottom part has a slope 14 for bringing the solid by gravity to a low point 16 in the reservoir, from which the vertical conveyor 8 extends in the form of a worm, or a device fulfilling a similar function.

With reference more specifically to FIGS. 2 and 3, the body 6 of the reactor is in the form of a helical duct 20, with a vertical axis 22. To produce this duct, first of all a helix 24 is provided, forming several turns 24a-24c about the axis 22. Each helix turn extends over a complete revolution, that is to say over 360°, and is formed for example by means of a split ring made from stainless steel, the ends of which are offset vertically from each other. The length of this offset depends on the slope sought for the helix 24, which is here preferentially around 10° with respect to any horizontal plane.

The rings assembled end-to-end form the helix 24, the top surface of which forms a helical bottom track 26 of the duct, over which the reactive solid is intended to slide by gravity between an inlet 28 and an outlet 30 of this duct. Moreover, this track 26 has a coating with a low coefficient of friction to assist the gravity sliding, this coating being able to be hard chromium.

One of the particularities of the present invention lies in the presence of passages 40 through the helix 24, these passages preferentially being vertical. Each passage 40 is therefore a through passage, namely it emerges on one hand on the helical lower track 26 at a turn 20a-20c of the duct, and on the other hand emerges in the directly lower duct turn. In other words, part of the reactive solid sliding over one of the helix turns 24a-24c is caused to follow one of the passages 40, by means of which it joins the directly lower helix turn without making any revolution movement on the track 26 that it has left, but simply falling by gravity through the passage 40 concerned. The impacts caused by these bifurcations of part of the reactive solid provide a division and de-stratification of the bed of reactive solid sliding over said directly lower helix turn, which procures subsequent advantages in terms of heat exchanges and transfer of mass. For the same purpose, deflectors could be provided on the internal sliding track 26.

The passages 40 have a cylindrical shape, with a diameter of between 0.5 and 8 mm. They are preferentially distributed on lines orthogonal to the helical direction of the flow of solid sliding over the track 26. As is shown in FIG. 3, four lines per helix turn 24a-24c may be provided, and 1 to 6 passages per line.

Moreover, the helix 24 has an internal cylinder 32 passing through it internally, for example 240 mm in diameter, and enclosed by an external cylinder 34, corresponding to the continuity of the lateral metal sheet 10 of the reservoir. Moreover, these two elements 34, 10 preferentially form a single cylinder, produced in a single piece.

The internal edge of the helix 24 matches the internal cylinder 32 on which it is preferentially welded, so that the external edge of this helix matches the external cylinder 34 on which it is also preferentially welded.

The outlet 30 of the reactor body 6 emerges above the reservoir 2, so that the reactive solid automatically falls by gravity into the latter, after having slid over the entire helical track 26. The inlet 28 is covered with a filter 42, which may be formed by a metallic or polymer fabric, tensioned by a rigid frame. Above the filter 42 is the air/liquid exchanger 7, the outlet 44 of which for heat-transport gas, preferentially dry air, has a circular cross section approximately 200 mm in diameter. In addition, another outlet of this exchanger 7 supplies a heating system 46.

Furthermore, the reactor comprises means for bringing the solid reagent 4 to the inlet 28 of the helical duct 20, these means here taking the form of a simple opening 50 at the top end of the sheath 52 housing the conveyor 8. At the discharge from this conveyor, the solid 4 is therefore projected directly into the inlet 28, passing through the opening 50. A connection piece could nevertheless be used between the opening 50 and the inlet 28, without departing from the scope of the invention.

Finally, the reactor 1 comprises means 54 for circulating a heat-transport gas in the helical duct 20, from the outlet 30 to the inlet 28 of this duct, above the reactive solid sliding in the opposite direction. These means 54 are conventional and known to persons skilled in the art. They may for example be a pump, a fan or the like.

In operation, the reactive solid 4 is placed in the reservoir 2 and then passes continuously by means of the vertical conveyor 8 in order to enter the body of the reactor, via the inlet 28 of the duct 20. It next slides over the track 26 and therefore follows a helical movement during which it embraces the heat-transport gas injected in the opposite direction from the outlet 30. It is during this flow in opposite directions that the chemical/physical reactions occur, enabling the gas, for example moist air at atmospheric pressure, to be heated or cooled. The heat-transport gas emerging through the inlet 28 of the duct 20 next joins the exchanger 7, passing through the filter 42, this exchanger being able to supply the heating circuit 46 and deliver dry warm air through its outlet 44, according to one of the operating modes envisaged.

This functioning takes place continuously, the reactive solid being intended to pass several times through the body of the reactor 6. Moreover, the reactive solid 4, in the form of powder the grain size of which may be between 0.1 and 2 mm in diameter, can be produced from the following materials: strontium bromide $SrBr_2$, sodium metasilicate $Na_2SiO_3$, ammonium alum $Na_4Al(SO_4)_2$, potassium alum $KAl(SO_4)_2$, or any other reactive solid deemed to be favourable for the solid/heat-transfer gas thermochemical reactions.

By way of indicative example, the reactive solid is introduced at a rate of approximately 4.5 kg/h, while the reactive heat-transport gas is injected at a rate of around 400 kg/h.

Figure 4:
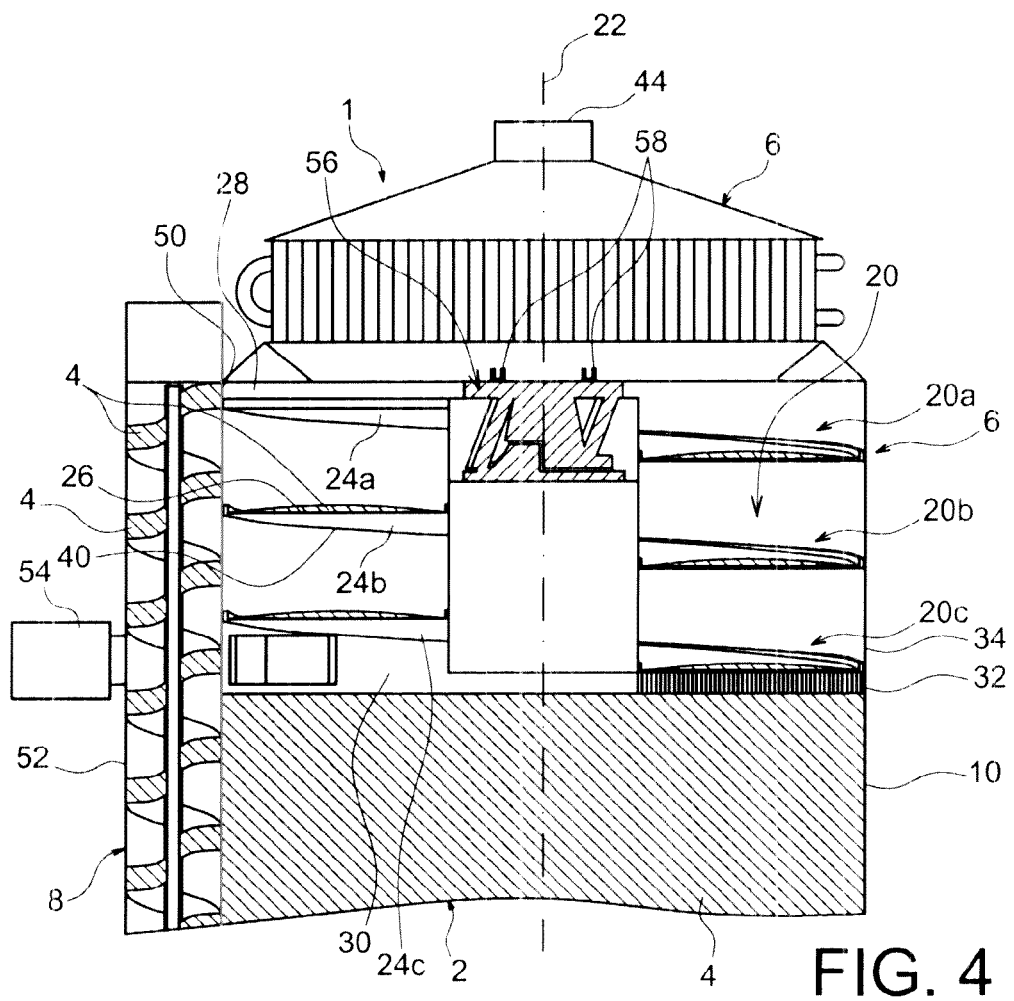
FIG. 4 shows a view in section of a solid/heat-transport gas reactor according to a second preferred embodiment of the present invention.

With reference to FIG. 4, a reactor 1 is shown according to a second preferred embodiment of the present invention. This second embodiment is similar to the previous one. In this regard, it should be noted that, in all the figures, the elements bearing the same numerical references correspond to identical or similar elements.

Thus it can be seen that this second embodiment differs from the previous one through the inclusion of a vibrating pot 56 coupled to the helical duct 20. This pot 56 is capable of creating a rotary acceleration along the axis 22, in order to generate an asymmetric vibration. This is because a stronger acceleration is provided in one rotation direction than in the other, so that the reactive solid 4 slides while it is carried by the movement in the opposite direction, so that this reactive solid moves in a single direction on the track 26. This particularity makes it possible to reduce the slope of the helix 24, which can thus be reduced to a value of around 3°, which nevertheless, simultaneously, confers a slight gravity sliding. The result is a reduced vertical size of the reactor.

To do this, the vibration pot 56 is partially integrated in the internal cylinder 32 to which it is fixed. Moreover, another part of this pot is fixed to the top of the external cylinder 34 by longitudinal members 58. On the other hand, the external edge of the helix 24 is no longer welded to this external cylinder 34, to enable this helix to vibrate. An elastic seal (not referenced) is preferably provided between these two elements 24, 34 to allow the required vibrations while affording an aeraulic seal.

Figure 5:
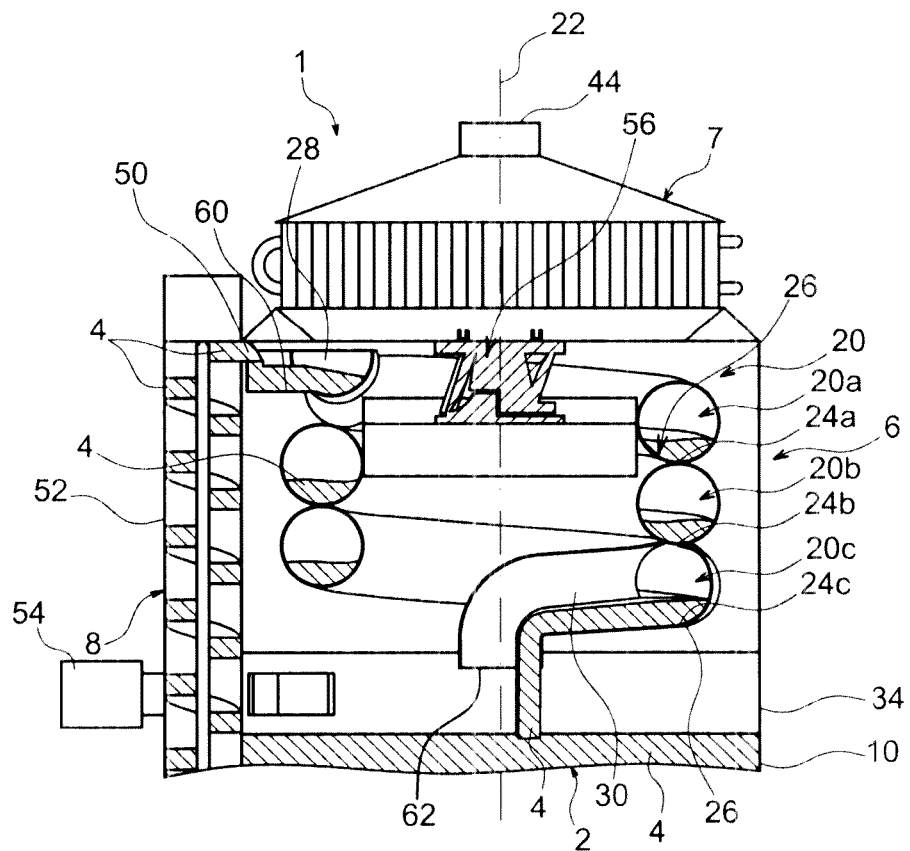
FIG. 5 shows a view in section of a solid/heat-transport gas reactor according to a third preferred embodiment of the present invention.
Figure 6:
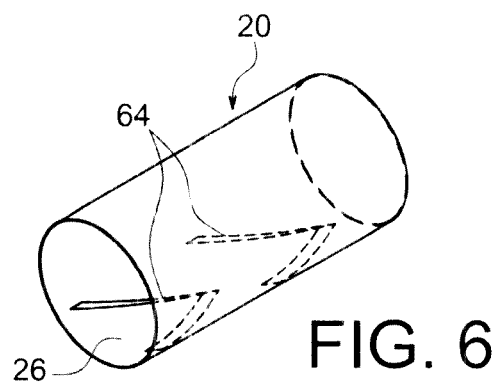
FIG. 6 shows a view in perspective of a part of the tube of the reactor shown in the previous figure, according to an alternative embodiment.
Figure 7:
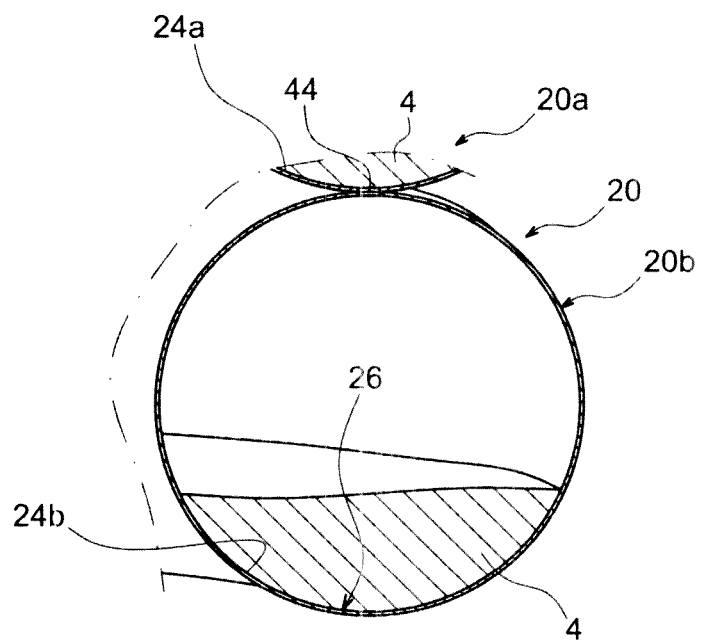
FIG. 7 shows a view in perspective showing a passage between two turns of the helical duct of the reactor shown in FIG. 5.

With reference now to FIGS. 5 to 7, a reactor 1 is shown according to a third preferred embodiment of the present invention. This third embodiment includes a vibrating pot 56 like the previous one, but could alternatively be based on a solution with gravity sliding of the reactive solid, without departing from the scope of the invention.

The essential difference from the previous embodiments lies in the design of the helical duct 20, which here takes the form of a simple tube shaped in a helix. The tube is for example produced from plastics material or chromium-plated stainless steel.

The tube 20, with a circular cross section, is for example obtained simply by means of a straight tube rolled hot around a cylinder in order to give it its helix shape. In the embodiment shown, the duct turns 20a-20c are in contact with one another, which confers maximum compactness. In addition, in this preferred embodiment, the lower helical track 26 on which the solid 4 slides is produced by the bottoms 24a-24c of the turns of the duct 20a-20c.

An intermediate piece 60 here connects the inlet 28 of the duct 20 and the opening 50 formed at the end of the sheath 52 of the conveyor 8. The piece 60 thus forms an integral part of said means for bringing the solid reagent 4 to the inlet 28 of the helical duct 20. Likewise, a piece 62 extends the outlet 30 of the duct 20, so as to pour the reactive solid at the centre of the reservoir 2.

In FIG. 6, the helical track 26 is equipped with deflectors 64 for generating de-stratifications in the granular bed of reactive solid 4 sliding over this track. The deflectors 64, made from aluminium, stainless steel or a plastics material, may take any form and any size deemed appropriate to a person skilled in the art. It may for example be a V or chevron shape, with the tip oriented upstream with respect to the direction of helical flow of the reactive solid 4. The angle of these deflectors may be between 15° and 20°.

FIG. 7 shows one of the passages 40 connecting the duct turn 20a to the lower duct turn 20b. This passage is produced by passing through the bottom wall of the duct turn 20a and by passing through the top wall of the duct turn 20b, the two orifices then being aligned and continuous with each other. In the case where the duct turns 20a-20c are spaced apart from each other, channels connecting the two orifices may be assembled.

Figure 8:
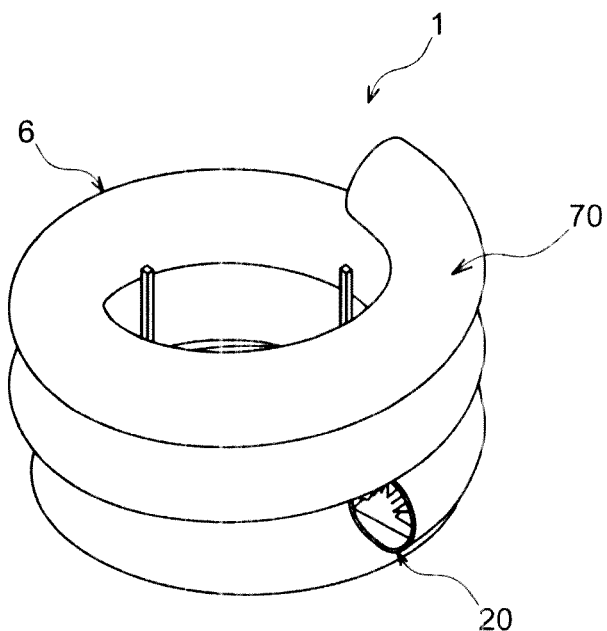
FIG. 8 shows a perspective view of a solid/heat-transport gas reactor according to a fourth preferred embodiment of the present invention.
Figure 9:
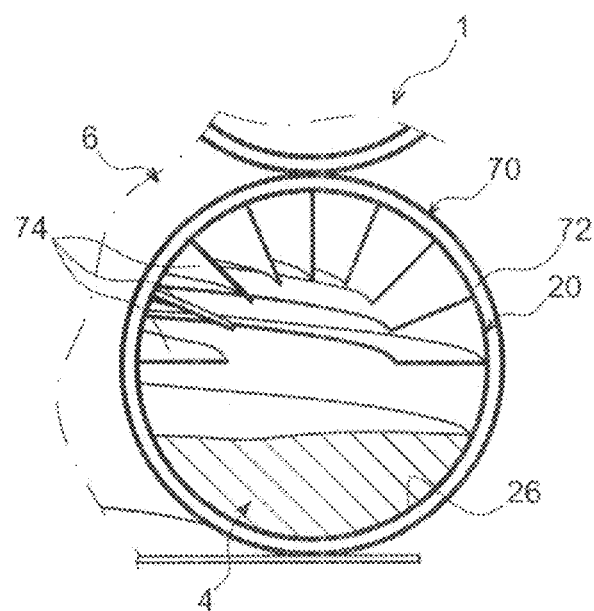
FIG. 9 shows an enlarged view of a part of the reactor shown in the previous figure.

Finally, with reference to FIGS. 8 and 9, the reactor body 6 of a reactor 1 according to a fourth preferred embodiment of the present invention is shown. This fourth embodiment, including a vibrating pot or not, still has the tube 20 forming the helical duct.

The particularity lies here in the presence of a second tube 70 with a larger diameter, also conformed in a helix, in which the first tube 20 is inserted.

The two tubes 20, 70 inserted one in the other define between them an annular space 72 intended to have a heat-transport fluid pass through it, affording a heat exchange with the heat-transport gas circulating in the first tube. The two tubes 20, 70 then form an integral heat exchanger, with greatly reduced size. To promote the heat exchanges, the first tube 20 is preferably produced from stainless steel and equipped with internal thermal conduction fins 74, implemented by thin aluminium sheets. These fins, preferably oriented radially, are situated in the top part of the duct 20, where the heat-transport gas circulates, preferably in the same direction of flow as that of the fluid in the annular space 72, the thickness of which may be around 1 to 2 mm.

The second tube 70 may have a circular or other cross section, for example fluted, with helical internal flutes for intensifying the heat exchanges with the heat-transport gas, by turbulence.

Naturally, various modifications can be made by a person skilled in the art to the invention that has just been described solely by way of non-limitative examples.

The invention claimed is:

1. A solid/heat-transport and reactive gas reactor, comprising:
    a helical duct including a first tube shaped as a helix and having an inlet and an outlet, the helical duct defining a helical bottom track on which a solid reagent can slide from the inlet to the outlet of the helical duct;
    an opening configured to bring the solid reagent to the inlet of the helical duct;
    means for causing a heat-transport gas to flow in the helical duct, from the outlet to the inlet of the helical duct;
    a second tube shaped as a helix,
        wherein the first tube is disposed in the second tube and defines a space between both of the first tube and the second tube, and
        wherein the space between the first tube and the second tube is configured to have a heat-transport fluid pass through the space, so that heat exchange can occur between the heat-transport gas circulating in the first tube and the heat-transport fluid, a reservoir of solid reagent under the outlet of the helical duct; and a conveyor configured to convey the solid reagent from a low point of the reservoir to the opening configured to bring the solid reagent to the inlet of the helical duct.

2. The reactor according to claim 1, wherein the helical duct comprises a plurality of passages each emerging on either side of the helical bottom track, at a given turn on the helical duct, and in a directly lower turn of the helical duct.

3. The reactor according to claim 1, wherein the helical duct is configured so that the solid reagent slides by gravity over the helical bottom track.

4. The reactor according to claim 1, further comprising a vibrator configured to vibrate the helical duct to make the solid reagent slide over the helical bottom track.

5. The reactor according to claim 1, further comprising a heat exchanger supplied by the heat-transport gas coming from the inlet of the helical duct.

6. The reactor according to claim 1, wherein the helical duct has a vertical axis.

7. A solid/heat-transport gas method implemented by a reactor according to claim 1, comprising:
   sliding the solid reagent over the helical bottom track from the inlet to the outlet of the helical duct; and
   making the heat-transport gas flow in an opposite direction in the helical duct from the outlet to the inlet of the helical duct.

8. The method according to claim 7, wherein the solid reagent is a powder.

* * * * *